(12) United States Patent
Burwinkel et al.

(10) Patent No.: US 12,518,207 B2
(45) Date of Patent: Jan. 6, 2026

(54) PHYSICALLY MOTIVATED MACHINE LEARNING SYSTEM FOR AN OPTIMIZED INTRAOCULAR LENS CALCULATION

(71) Applicant: Carl Zeiss Meditec AG, Jena (DE)

(72) Inventors: Hendrik Burwinkel, Munich (DE); Holger Matz, Unterschneidheim (DE); Stefan Saur, Aalen (DE); Christoph Hauger, Aalen (DE); Nassir Navab, Munich (DE)

(73) Assignee: Carl Zeiss Meditec AG, Jena (DE)

( * ) Notice: Subject to any disclaimer, the term of this patent is extended or adjusted under 35 U.S.C. 154(b) by 754 days.

(21) Appl. No.: 17/759,356

(22) PCT Filed: Jan. 21, 2021

(86) PCT No.: PCT/EP2021/051298
§ 371 (c)(1),
(2) Date: Jul. 22, 2022

(87) PCT Pub. No.: WO2021/148517
PCT Pub. Date: Jul. 29, 2021

(65) Prior Publication Data
US 2023/0057389 A1    Feb. 23, 2023

(30) Foreign Application Priority Data

Jan. 24, 2020   (DE) .......................... 102020101762.6

(51) Int. Cl.
*G06F 17/00*   (2019.01)
*A61F 2/16*    (2006.01)
(Continued)

(52) U.S. Cl.
CPC ............... *G06N 20/00* (2019.01); *A61F 2/16* (2013.01); *G06N 5/04* (2013.01); *A61F 2240/002* (2013.01)

(58) Field of Classification Search
CPC .. G06N 20/00; G06N 5/04; A61F 2/16; A61F 2240/002
(Continued)

(56) References Cited

U.S. PATENT DOCUMENTS

2014/0276025 A1\*  9/2014  Durbin ................ A61B 3/0025
                                            600/407
2019/0099262 A1    4/2019  Ladas
(Continued)

FOREIGN PATENT DOCUMENTS

EP           3491996 A1       6/2019

OTHER PUBLICATIONS

May 3, 2021 Written Opinion (WO) of the International Searching Authority (ISA) and International Search Report (ISR) issued in International Application No. PCT/EP2021/051298 (with English Translation).
(Continued)

*Primary Examiner* — Pavan Mamillapalli
(74) *Attorney, Agent, or Firm* — Honigman LLP; Brett A. Krueger

(57) ABSTRACT

A computer-implemented method for determining the refractive power of an intraocular lens to be inserted is presented. The method includes generating first training data for a machine learning system on the basis of a first physical model for a refractive power for an intraocular lens and training the machine learning system by means of the first training data generated, for the purposes of forming a first learning model for determining the refractive power. Furthermore, the method includes training the machine learning system, which was trained using the first training data, using clinical ophthalmological training data for forming a second learning model for determining the refractive power and providing ophthalmological data of a patient and an
(Continued)

expected position of the intraocular lens to be inserted. Moreover, the method includes predicting the refractive power of the intraocular lens to be inserted by means of the trained machine learning system and the second learning model. In the process, the ophthalmological data provided and the position of the intraocular lens are used as input values for the machine learning system with the second learning model.

9 Claims, 6 Drawing Sheets

(51) Int. Cl.
　　　*G06F 7/00*　　　(2006.01)
　　　*G06N 5/04*　　　(2023.01)
　　　*G06N 20/00*　　(2019.01)
(58) Field of Classification Search
　　　USPC .......................................................... 706/12
　　　See application file for complete search history.

(56) References Cited

U.S. PATENT DOCUMENTS

| 2019/0110753 | A1  | 4/2019  | Zhang et al. |
| 2020/0015894 | A1  | 1/2020  | Bor et al. |
| 2020/0245858 | A1* | 8/2020  | Takeno ................ A61B 3/0058 |
| 2021/0286996 | A1* | 9/2021  | Saur ........................ G16H 30/40 |
| 2022/0331093 | A1* | 10/2022 | Matz ...................... A61F 2/1627 |
| 2024/0136066 | A1* | 4/2024  | Burwinkel ............. G16H 50/20 |

OTHER PUBLICATIONS

Nov. 27, 2020 Office Action issued in corresponding German Application No. 10 2020 101 762.6 (in German language).
Deep Learning for Computer Vision, Jason Brownlee, „A Gentle Introduction to Transfer Learning for Deep Learning, URL: https://machinelearningmastery.com/transfer-learning-for-deep-learning/, [recherchiert/abgerufen am Nov. 27, 2020].

* cited by examiner

PHYSICALLY MOTIVATED MACHINE LEARNING SYSTEM FOR AN OPTIMIZED INTRAOCULAR LENS CALCULATION

CROSS-REFERENCE TO RELATED APPLICATIONS

This application is the U.S. national stage of PCT/EP2021/051298 filed on Jan. 21, 2021, which claims priority of German Patent Application DE 10 2020 101 762.6 filed on Jan. 24, 2020. The disclosures of these prior applications are considered part of the disclosure of this application and are hereby incorporated by reference in their entireties.

TECHNICAL FIELD

The disclosure relates to determining refractive power for an intraocular lens and, in particular, to a computer-implemented method for determining refractive power for an intraocular lens to be inserted, by means of transfer learning, to a corresponding system, and to a corresponding computer program product for carrying out the method.

BACKGROUND

Replacing the biological lens of an eye with an artificial intraocular lens (IOL)—for example, in the case of an (age-related) refractive error or in the case of cataracts—has become ever more common in the field of ophthalmology in recent years. In the process, the biological lens is detached from the capsular bag by way of a minimally invasive intervention and removed. The lens, which has become opacified in the case of a cataract, is then replaced by an artificial lens implant. In the process, this artificial lens implant or intraocular lens is inserted into the then empty capsular bag. Knowledge of the correct position of the intraocular lens and the necessary refractive power depend on one another.

In known, currently available IOL calculation formulas, use is made of physical models of differing complexity (e.g., the vergence principle in the known Haigis formula). In this way, it is possible to carry out a more precise determination of IOL refractive power not only on the basis of data, but also with the aid of physical prior knowledge. Despite a slightly improved accuracy, these formulas are always approximations which currently are unable to reproduce the full reality of the biological eye. The use of ray tracing methods facilitates a further improvement in the accuracy of a model as many other, older models only work in paraxial approximation; however, approximations are also included in the system in this case, for example by way of the shape of the refractive interfaces. In relation to an availability of data, physical models can be finely adjusted or tuned with the aid of various parameters. However, the structure of said models and the choice of these parameters is to be specified by the respective developer, and therefore not necessarily the best possible representation. There can only be a qualified optimal adaptation of the entire system in this form, and its flexibility is restricted by the chosen model.

Proceeding from the disadvantages of the known methods for approximately determining a correct refractive power for an IOL to be inserted, an underlying object of the concept presented herein is that of specifying a method and a system for improved IOL refractive power inferences for an intraocular lens.

SUMMARY

This object is achieved by the method proposed here, the corresponding system and the associated computer program product in accordance with the independent claims. Further embodiments are described by the respective dependent claims.

According to an aspect of the present disclosure, a computer-implemented method for determining refractive power for an intraocular lens to be inserted is presented. The method can include a generation of first training data for a machine learning system on the basis of a first physical model for a refractive power for an intraocular lens. The method can include training the machine learning system by means of the first training data generated, for the purposes of forming a first learning model for determining refractive power and training the machine learning system trained with the first training data using clinical ophthalmological training data, for the purposes of forming a second learning model for determining refractive power.

The method may furthermore include providing ophthalmological data of a patient and an expected position of the intraocular lens to be inserted, and inferring the refractive power of the intraocular lens to be inserted, by means of the trained machine learning system and the second learning model. In this case, the provided ophthalmological data and the position can be used as input values for the machine learning system with the second learning model.

According to another aspect of the present disclosure, a system for determining refractive power for an intraocular lens to be inserted is presented. The system may comprise a generation module adapted to generate first training data for a machine learning system on the basis of a first physical model for the refractive power for an intraocular lens and a first training module adapted to train the machine learning system by means of the first training data generated, for the purposes of forming a first learning model for determining refractive power.

Furthermore, the system may comprise a second training module adapted to train the machine learning system trained with the first training data using clinical ophthalmological training data, for the purposes of forming a second learning model for determining refractive power, and a receiver module adapted to provide ophthalmological data of a patient and an expected position of the intraocular lens to be inserted.

Moreover, the system may comprise an inference unit adapted to infer the refractive power of the intraocular lens to be inserted, by means of the trained machine learning system and the second learning model. In this case, the provided ophthalmological data and the position of the intraocular lens can be used as input values for the machine learning system with the second learning model.

Moreover, embodiments may relate to a computer program product able to be accessed from a computer-usable or computer-readable medium that contains program code for use by, or in connection with, a computer or other instruction processing systems. In the context of this description, a computer-usable or computer-readable medium can be any device that is suitable for storing, communicating, transferring, or transporting the program code.

The computer-implemented method for determining refractive power for an intraocular lens to be inserted has a plurality of advantages and technical effects which may also apply accordingly to the associated system: A learning system for determining refractive power for an intraocular lens to be inserted which is only based on available clinical ophthalmological data firstly would require a comparatively long training time, and secondly known properties of physical models would not be able to be taken into account.

The method presented here, by contrast, uses the best from both worlds: firstly the world of physical-mathematical models and secondly however also the world of clinical ophthalmological data. In the process, the proposed method can make two-fold use of the principle of transfer learning. Firstly, the principle of transfer learning can be advantageously used from the first training run with the first training data generated to the second training run by means of training data from a second, more accurate physical model. However, secondly, it can also be advantageously used whenever only an initial learning step that is based on training data generated by a physical model is used and the training on the basis of clinical, ophthalmological data is then subsequently carried out in order to generate the second learning model, which can then be used to carry out the inference of the refractive power. In particular, as a result of the pre-training with a large amount of data generated by a physical model, the system is forced to recognize the physical relationships and to apply this prior knowledge to the real data in the transfer step. The real data, on account of its restricted amount and measurement errors, would otherwise be insufficient to precisely capture the physics of the underlying mechanism.

In this case, the pretraining on the basis of physical data also permits transfer training on a very small real data set since the pretraining reduces the susceptibility to overfitting. Normally, complex machine models would otherwise not be suitable for an inference on very small data sets as they have too little data for a meaningful generalization on account of their significant adaptability, and would thus poorly map the totality of the data.

Additionally, the speed advantage arising when an already trained machine learning model is retrained by better or further training data is exploited in each case. This can significantly shorten the overall training time, allowing significant economization of computational power, and hence allowing better use of the available computer capacities.

Further exemplary embodiments are presented below, which can have validity both in conjunction with the method and in conjunction with the corresponding system.

According to an advantageous exemplary embodiment of the method, the step of training the machine learning system may additionally include generating second training data on the basis of a second physical model for the refractive power for the intraocular lens, with the second physical model being more accurate than the first model. Additionally, this exemplary embodiment may include training the machine learning system, which was already trained using the first training data, by means of the second training data generated, for the purposes of developing the first learning model.

By using training data of a second physical model which is able to supply more accurate data—i.e., which represents a better approximation—for the refractive power of the IOL to be inserted, the concept for determining refractive power presented here can be improved further. As a result of the model already having been trained by the first training on the basis of the first physical model, further training with improved training data would require a comparatively short training time span.

A further advantage of this iterative training procedure also consists of the fact that even more accurate physical models can be used in further steps, in order to obtain even better training data. In this case, too, the learning model to be trained would profit in terms of time from the pretraining using less accurate physical models. In theory, ever finer physical models could be used for the training or for the generation of training data.

According to a further exemplary embodiment of the method, the machine learning system can be a neural network. In this case, this may be a convolutional neural network (CNN). CNNs were found to be particularly helpful when the task is to process image data to be classified.

Alternatively, use could also be made of possibly present time-dependent data from 4-D scans of the eye (three spatial directions and changes of the scan data of the eye over time). In this case, use could be made of an RNN (recurrent neural network), either as a replacement for the aforementioned CNN or in addition thereto.

According to an advantageous exemplary embodiment of the method, the ophthalmological data of an eye may include at least one datum from the group consisting of an axial length, an anterior chamber depth, a lens thickness, a posterior chamber depth, a corneal thickness, a corneal keratometry, a lens equatorial plane, a white-to-white distance and a pupil size. It is understood here that respective numerical values of the aforementioned parameters are intended. Currently, these eye parameters can be determined elegantly with great accuracy by way of an eye scan.

According to a further advantageous exemplary embodiment of the method, the first physical model can be representable by a mathematical model or a formula. In this case, model data of a plurality of hypothetical patients would be able to be used as a basis for a first training run for the machine learning system. Training data for the machine learning system can be advantageously generated elegantly and without much computational outlay from the mathematical model of the physical model. The generated data may be equivalent to clinical ophthalmological data, i.e., for example have the same data format.

Alternatively, already this step of the proposed method on the basis of a ray tracing model or on the basis of another machine learning system can be carried out data for training the learning system according to the proposition.

According to an extended exemplary embodiment of the method, the second physical model can be representable as a mathematical model or as a ray tracing model. Consequently, the options of using different methods to make available improved model-based training data also arises in the second stage of generating training data. This can increase the leeway when individualizing the proposed method for certain uses.

According to a further extended exemplary embodiment of the method, the clinical ophthalmological training data can be determined or generated manually or by means of a third machine learning system. In this context, manually would mean measured by means of an eye scan apparatus. In contrast thereto, the training data generated by means of a third machine learning system would tend to have more of an artificial nature, with it however also being possible to use a comparatively small amount of clinical ophthalmological data in order to provide a greater amount of training data for the final learning step by means of the third, already trained machine learning system. In this way, the method presented here would also be usable with a comparatively small amount of clinical ophthalmological data, which would normally not be sufficient to be refined by means of the transfer learning step from physical model(s) to true clinical data.

It is pointed out that exemplary embodiments of the disclosure may be described with reference to different implementation categories. In particular, some exemplary embodiments are described with reference to a method, whereas other exemplary embodiments may be described in the context of corresponding devices. Regardless of this, it is possible for a person skilled in the art to identify and to combine possible combinations of the features of the method and also possible combinations of features with the corresponding system from the description above and below—if not specified otherwise—even if these belong to different claim categories.

Aspects already described above and additional aspects of the present disclosure become apparent inter alia from the exemplary embodiments that are described and from the additional further specific refinements described with reference to the figures.

BRIEF DESCRIPTION OF THE DRAWINGS

Preferred exemplary embodiments of the present disclosure are described by way of example and with reference to the following figures.

DETAILED DESCRIPTION OF PREFERRED EMBODIMENTS

Figure 1:
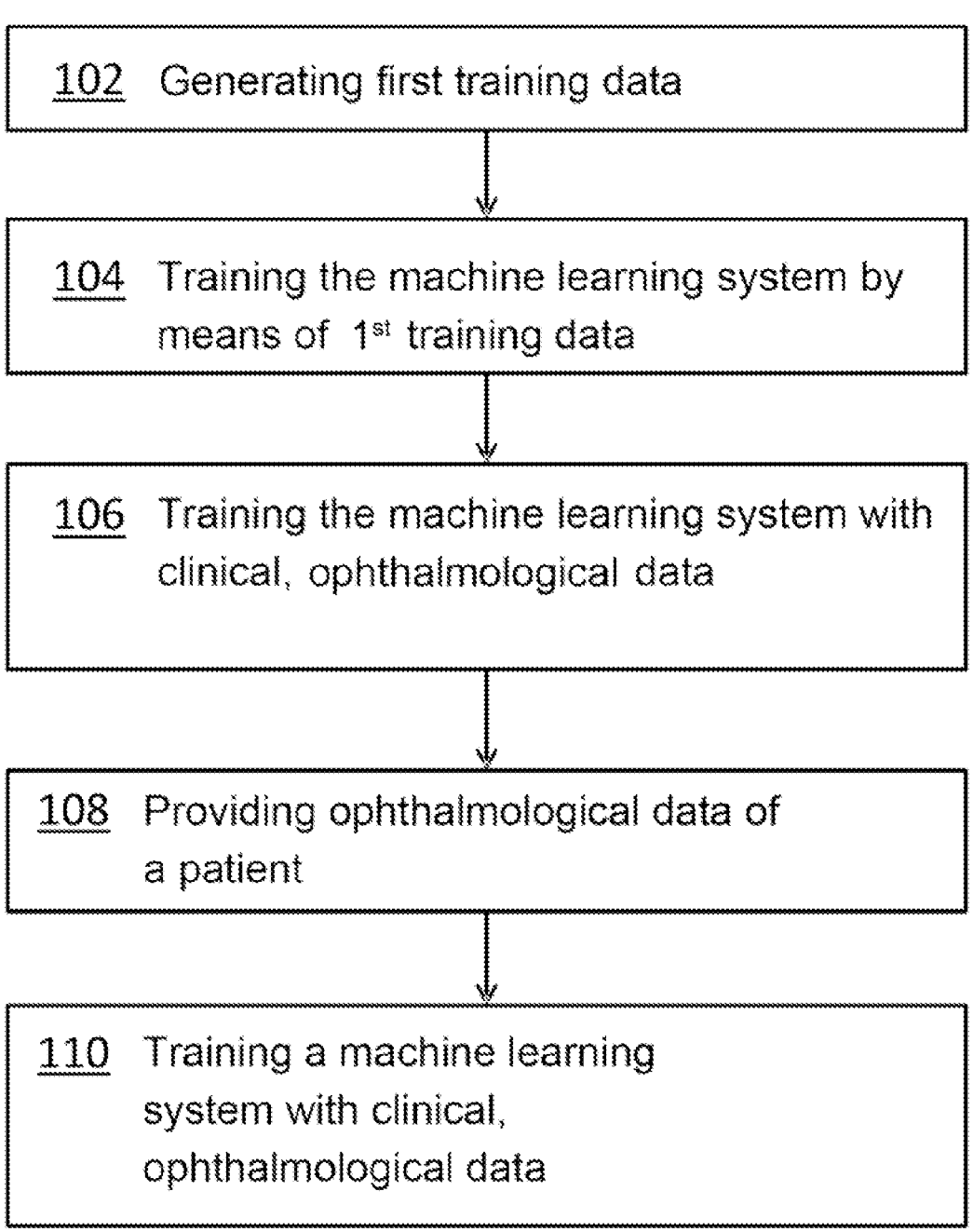
FIG. 1 illustrates a flowchart-like representation of an exemplary embodiment of the computer-implemented method for determining refractive power for an intraocular lens to be inserted.

In the context of this description, conventions, terms and/or expressions should be understood as follows:

The term "intraocular lens" describes an artificial lens which can be inserted into the eye of a patient by surgery to replace the natural, biological lens.

The term "machine learning system" describes a system that is also typically assigned to a method, said system learning from examples. To this end, annotated training data (i.e., also containing metadata) is fed to the machine learning system in order to infer output values—output classes in the case of a classification system—that were already set in advance. If the output classes are correctly output with sufficient precision—i.e., an error rate determined in advance—the machine learning system is referred to as trained. Different machine learning systems are known. These include neural networks, convolutional neural networks (CNN) or else recurrent neural networks (RNN).

In principle, the term "machine learning" is a basic term or a basic function from the field of artificial intelligence, wherein statistical methods, for example, are used to give computer systems the ability to "learn". By way of example, certain behavioral patterns within a specific task range are optimized in this case. The methods that are used give trained machine learning systems the ability to analyze data without requiring explicit procedural programming for this purpose. Typically, an NN (neural network) or CNN (convolutional neural network), for example, are examples of systems for machine learning, for forming a network of nodes which act as artificial neurons, and artificial connections between the artificial neurons (so-called links), wherein parameters (e.g., weighting parameters for the link) can be assigned to the artificial links. When training the neural network, the weighting parameter values of the links adjust automatically on the basis of input signals so as to generate a desired result. In the case of supervised learning, the images supplied as input values (training data)—generally (input) data—are supplemented with desired output data (annotations) in order to generate a desired output value (desired class). Considered very generally, mapping of input data onto output data is learned.

The term "neural network" describes a network made of electronically realized nodes with one or more inputs and one or more outputs for carrying out calculation operations. Here, selected nodes are interconnected by means of connections—so-called links or edges. The connections can have certain attributes, for example weighting parameter values, by means of which output values of preceding nodes can be influenced.

Neural networks are typically constructed in a plurality of layers. At least an input layer, a hidden layer, and an output layer are present. In a simple example, image data can be supplied to the input layer and the output layer can have classification results in respect of the image data. However, typical neural networks have a large number of hidden layers. The way in which the nodes are connected by links depends on the type of the respective neural network. In the present example, the inference value of the neural learning system can be the sought-after refractive power of the intraocular lens.

The term "recurrent neural network" denotes neural networks which, in contrast to the feed-forward networks, are distinguished by links of neurons (i.e., nodes) of one layer to neurons of the same or a preceding layer. This is the preferred manner of interconnection of neural networks in the brain, in particular in the neocortex. In artificial neural networks, recurrent connections of model neurons are used to discover time-encoded—i.e., dynamic—information in the data. Examples of such recurrent neural networks include the Elman network, the Jordan network, the Hopfield network and the fully connected neural network. They are also suitable for examining a dynamic behavior in recordings of eyes, in particular for taking account of the accommodation behavior of the eye.

The term "convolutional neural network" (CNN)—as one example of a classifier/classifier system—describes a class of artificial neural networks that are based on feedforward techniques. They are often used for image analyses using images, or the pixels thereof, as input data. The main components of convolutional neural networks are in this case convolution layers (hence the name) that allow efficient evaluation through parameter sharing. In contrast to the CNN, each pixel of the recorded image would typically be associated with an artificial neuron of the neural network as an input value in a conventional neural network.

Within the context of this text, the term "transfer learning" (or else curriculum learning) describes that a once developed learning model—developed by way of training the machine learning system with the training data of the physical model—is trained again. Although it is trained using related data in this second time, these data originate from a different source than in the case of the first training. These may consist either of clinical ophthalmological data or of a second physical model, which is known for a greater accuracy of the results obtained. As a result, a second learning model is generated, which unifies in itself both the physical model parameters and the real clinical data. The "knowledge" of the respective first learning model is therefore used as a base or starting point for the training to generate the second learning model. The learning effect of the first training can thus be transferred to the learning effect of the second training. A substantial advantage consists in the fact that the second training can be carried out more effectively in comparison, as a result of which computer resources can be economized and as a result of which the second training runs in a quicker and more targeted fashion.

The term "parameter value" describes geometric or biometric values, or ophthalmological data of an eye of a patient. Examples of parameter values of an eye are discussed in more detail on the basis of FIG. 2.

The term "scan result" describes digital data, for example on the basis of digital images/recordings, which represent the result of an OCT (optical coherence tomography) examination on an eye of a patient.

The term "optical coherence tomography" (abbreviated OCT) describes a known imaging method of ophthalmology, for obtaining two- and three-dimensional recordings (2-D or 3-D) of scattering materials (e.g., biological tissue) with micrometer resolution. In the process, use is essentially made of a light source, a beam splitter and a sensor—for example in the form of a digital image sensor. In ophthalmology, OCT is used to detect spatial differences in the reflection behavior of individual retinal layers, and morphological structures can be represented with a high resolution.

The term "A-scan" (also referred to as axial depth scan) describes a one-dimensional result of a scan of a patient's eye, which provides information about geometric dimensions and locations of structures within the eye.

The term "B-scan" describes a lateral overlay of a plurality of the aforementioned A-scans, to obtain a section through the eye. Volume views are also generable by combining a plurality of layers of the eye generated thus.

The term "en face OCT" in this case describes a method for producing transverse sectional images of the eye—in contrast to the longitudinal sectional images using the aforementioned A- or B-scans.

The term "dynamic eye data" describes a sequence of simple sectional images of the eye—usually in the same position—in order to recognize dynamic changes, that is to say changes over time—for example, the adaptability of the eye.

The term "digital image"—e.g., from a scan—in this case describes an image representation of, or the result of generating an amount of data in the form of pixel data from, a physically existing article: by way of example, a retina of an eye in this case. More generally, a "digital image" can be understood to be a two-dimensional signal matrix. The individual vectors of the matrix can also be adjoined to one another in order thus to generate an input vector for a layer of a CNN. The digital images can also be individual frames of video sequences.

The term "clinical ophthalmological training data" describes data about patients' eyes and intraocular lenses already inserted into these patients in the past. The clinical ophthalmological training data may include determined ophthalmological parameter values, such as also the refractive power and the position of the inserted lens. These data are used for the purposes of training the machine learning system which was already trained previously on the basis of data from a physical model. As a rule, the clinical ophthalmological training data are annotated.

The term "first training data" describes data that can be used to train the machine learning system. These first training data are generated on the basis of a physical model of the eye. The first learning model of the machine learning system can be the result of the training. The first training data created thus are generated virtually randomly by means of the physical model (i.e., by a statistical variation of independent variables, optionally also by additional boundary parameters); labels or annotations are additionally generated and specify the refractive power for this specific eye calculated from the physical model.

The term "physical model" relates to a mathematical formula which relates various parameters of an eye to one another in order to undertake determinations of refractive power. Known formulas include the Haigis formula and the Universal Barrett II formula. Moreover, a ray tracing method could be used.

The term "refractive power of an intraocular lens" describes the index of refraction of the IOL.

A detailed description of the figures is given below. It is understood in this case that all of the details and information in the figures are illustrated schematically. What is illustrated first of all is a block diagram of one exemplary embodiment of the computer-implemented method according to the disclosure for determining the refractive power for an intraocular lens to be inserted. Further exemplary embodiments, or exemplary embodiments for the corresponding system, are described below:

FIG. 1 illustrates a flowchart-like representation of an exemplary embodiment of the computer-implemented method 100 according to the disclosure for determining refractive power for an intraocular lens to be inserted—in particular to be inserted into a human eye. The method 100 includes a generation 102 of first training data for a machine learning system on the basis of a first physical model for a refractive power for an intraocular lens. As a result, training data are generated artificially on the basis of a mathematical formula which represent the physical model.

Then, the method 100 includes training 104 the machine learning system by means of the first training data generated, for the purposes of forming a first learning model for determining refractive power. The machine learning system can be a neural network system. By using the training data from the physical model—or from a plurality of physical models—theoretical know-how is used for determining the refractive power of the IOL. This theoretical know-how is manifested by the training in the first learning model.

Furthermore, the method 100 includes a training 106 of the machine learning system that was trained with the first training data using clinical ophthalmological training data, for the purposes of forming a second learning model for determining refractive power. In this way empirical values from earlier operations—in particular of inserted intraocular lenses—are used. This know-how then manifests itself by the second training step in the second learning model, which builds on the first learning model that was trained using theoretical data. The advantages of the transfer learning come to the fore at this point. The data format of the training data for generating the first learning model and the training data for generating the second learning model should be comparable as a matter of principle.

This facilitates optimal use of both prior physical knowledge and real data for the training of the machine learning system in order thus to improve the IOL refractive power inference. By taking account of complex prior physical knowledge, the model is able in its totality to adapt to the best possible extent to the available practical clinical data.

Subsequently, ophthalmological data of a patient and an expected position of the intraocular lens to be inserted are provided, 108, in the method 100. Potentially in conclusion the method 100 includes an inference 110 of the refractive power of the intraocular lens to be inserted, by means of the trained machine learning system with the second learning model. In this case, the provided ophthalmological data and a position of the intraocular lens are used as input values for the machine learning system with the second learning model. The determined refractive power can also be displayed or output in any other form. The position of the lens in the eye of the patient can be determined in any other form.

Figure 2:
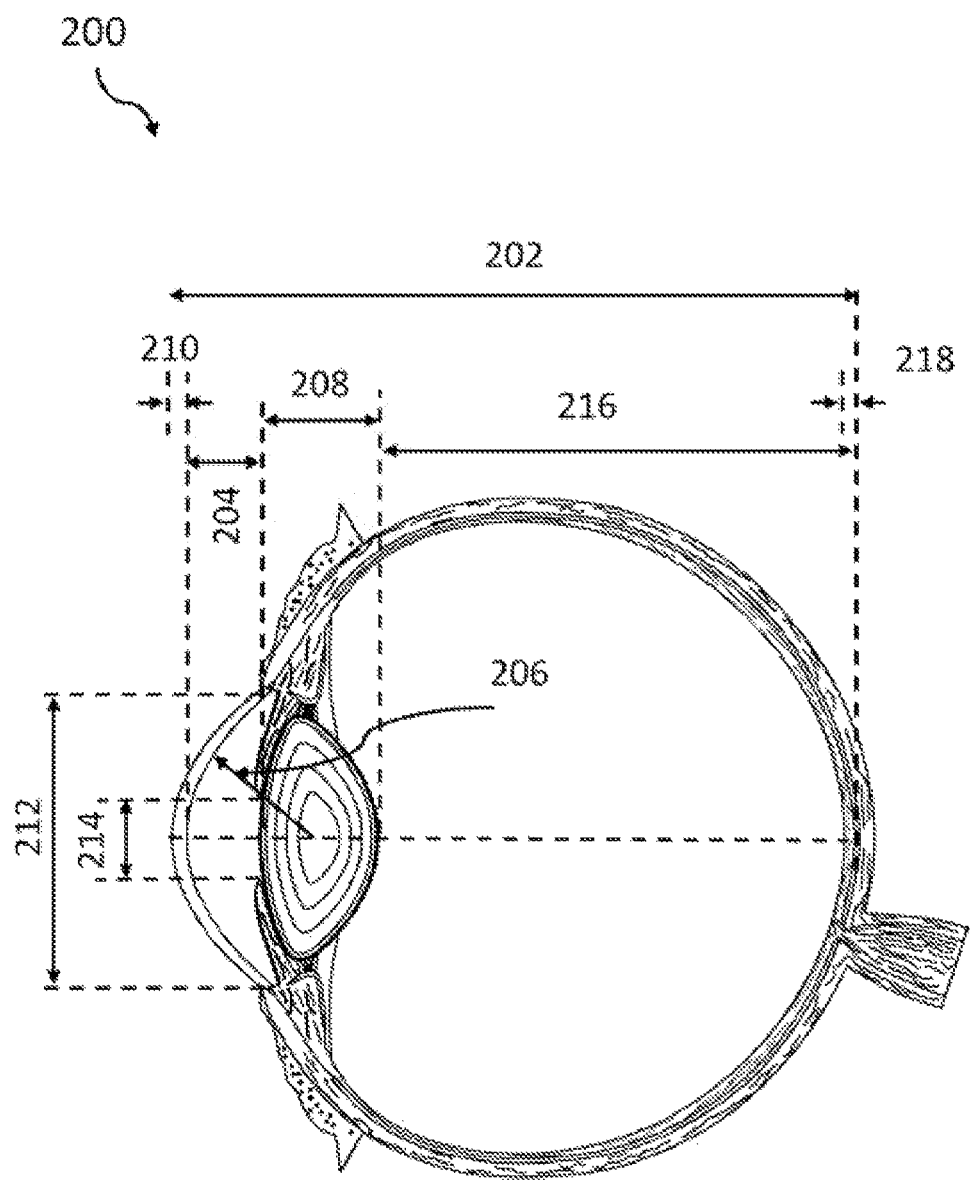
FIG. 2 illustrates an eye together with different biometric parameters of the eye.

FIG. 2 depicts an eye 200 with different biometric or ophthalmological parameters of an eye. In particular, the following parameters are represented: axial length 202 (AL), anterior chamber depth 204 (ACD), keratometry value 206 (K, radius), refractive power of the lens (power), lens thickness 208 (LT), central cornea thickness 210 (CCT), white-to-white distance 212 (WTW), pupil size 214 (PS), posterior chamber depth 216 (PCD), retina thickness 218 (RT). At least one of these parameters is contained both in the ophthalmological training data and in the ophthalmological data of a patient, which are each contained in the subject matter of the concept presented here.

Figure 3:
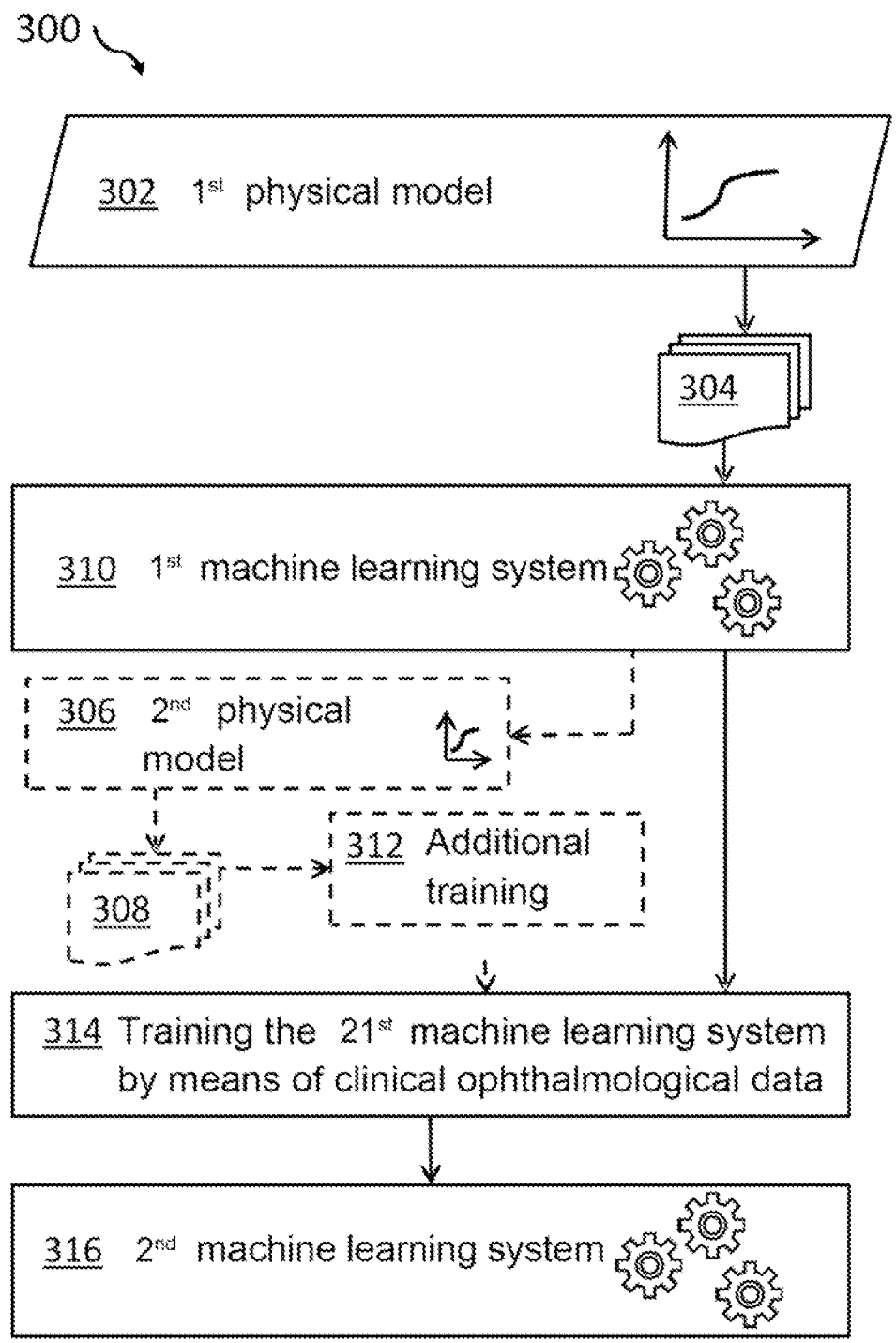
FIG. 3 illustrates a schematic structure of essential functional blocks of the underlying proposed method.

FIG. 3 represents a schematic structure 300 of essential functional blocks, which are helpful for the implementation of the proposed method. Initially, a suitable physical model 302 of the eye for determining refractive power is selected. Thus, training data are generated by virtue of one or more parameters of the model being varied and other parameters being calculated. Consequently, a plurality of tuples of parameter values or first training data 304 are generated on a theoretical basis. These data are used to train the machine learning system such that the first learning model arises. This may be a neural network system whose hyperparameters are predefined and whose variable parameter values are adapted by the training to the available data.

Optionally, a second physical model 306 can be used to generate additional training data 308. In this case, the second physical model 306 should optionally be chosen such that it is able to supply better or more accurate results for determining refractive power. The additional training data 308 generated thus can be used to train the already trained (first) machine learning system 310 again (additional training 312) such that the theoretical know-how of the two physical models are reproduced in the learning system 1*a* in this way and can be used for a refractive power inference.

In both cases, the trained machine learning system 1 (or 1*a*) is used to be trained again with clinical ophthalmological data, 314. In this case, too, a transfer learning step occurs again such that the physical model (at least the first physical model, possibly also the second physical model) and the practical, clinical data are now manifested in the 2nd learning model 316. An optimized determination of refractive power (not illustrated) can now be implemented on this basis.

Expressed differently, a machine learning system model incorporating the known physical prior knowledge is initially created with the aid of physical models. This can be implemented by virtue of, for example, the machine learning system being pre-trained using simulation data or the training itself possibly containing physical constraints (constraint based training). Subsequently, the learning model is adapted to true anatomical variations with the aid of real clinical ophthalmological data. In this case, the chosen approach facilitates a self-learned optimization for the entire machine learning system to any availability of data (e.g., post LASIK operations). In this case, an adaptation can be carried out explicitly for each physician or for each clinic. Then, real biometric data are used as input values for the machine learning system in the application phase of the machine learning system, in order thus to determine or predict the optimized intraocular lens refractive power.

The formulation of a physical model is converted into the pure parameter form of a neural network. The latter can then independently and to the best possible extent adapt itself to a real data structure in a second training phase. Hence, any quantity of training data can be generated with the aid of the optical physical model. These contain the parameters of the eye model and the associated IOL refractive power as so-called ground truth. With the aid of the "transfer learning" concept, the model trained thus can be transferred to a more complex, physical model which generates training data according to the same concept. Hence, the neural network already has pre-trained artificial neurons and can thus adapt itself quicker and more easily to the stronger or better physical model. This curriculum learning can be carried on to a model of any strength (e.g., a ray tracing model).

In the last step the learning model then is "fine-tuned" by real biometric data of patients' eyes, with the actually used IOL refractive powers being used as ground truth. Hence, the trained model can implement in the prediction phase the prediction of the ultimately required IOL refractive power. What was found in reality is the more real data (clinically ophthalmological data) are available, the better the machine learning system can be optimized in relation to said data. Therefore, the learning model can be successively developed in accordance with the availability of data and be adapted to various real data records.

Figure 4:
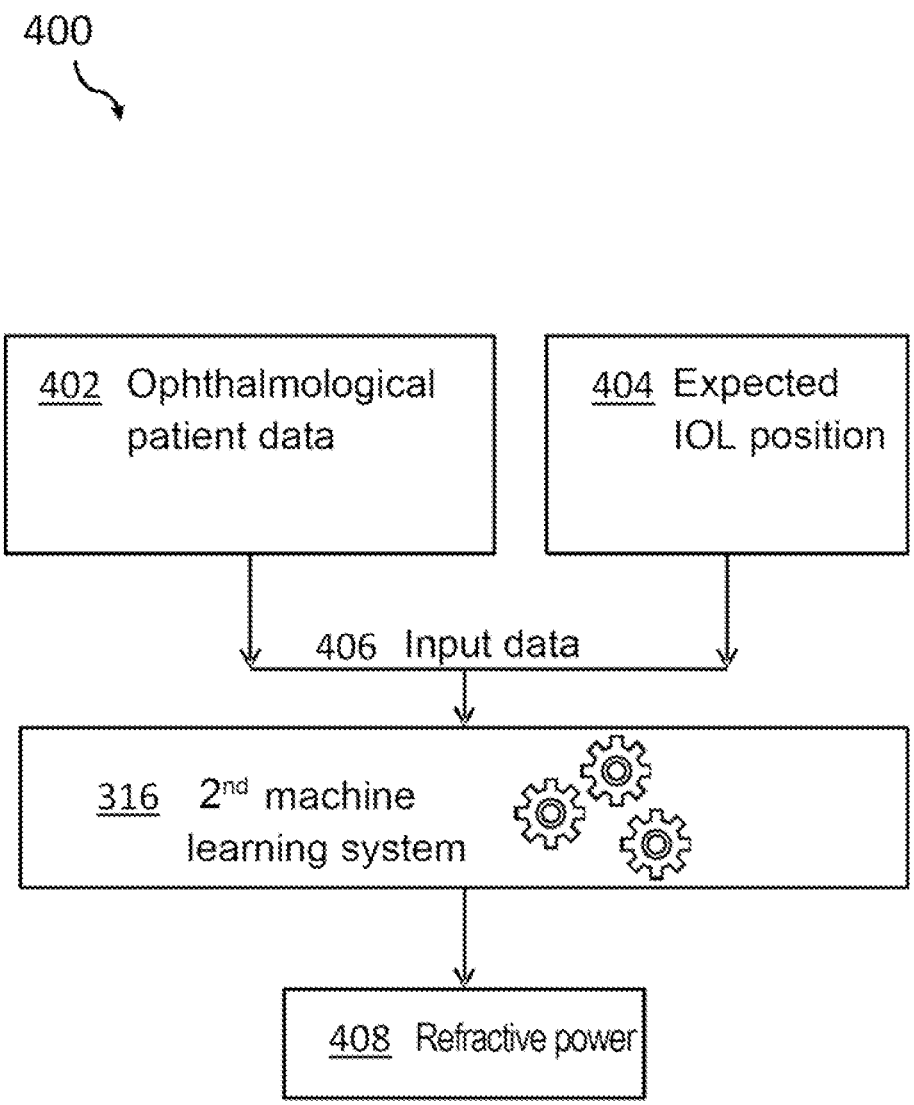
FIG. 4 shows a schematic illustration for the procedure of inferring the refractive power of the IOL.

FIG. 4 shows a schematic illustration 400 for the procedure of inferring the refractive power (inference phase) of the intraocular lens to be inserted. Ophthalmological data 402 of the patient in whom the IOL is intended to be implanted are determined as input parameters 406 for the second learning model of the machine learning system. These can be determined virtually manually by way of an eye scan. Moreover, the expected IOL position 404 in the eye—essentially the distance from the cornea in the anterior chamber—is used as an input parameter 406. By means of the second learning model, it is now possible to reliably determine or infer the refractive power (408) by virtue of the fact that use is made both of the knowledge of the physical model(s) and the practical experience, which is manifested by the clinical ophthalmological data.

Figure 5:
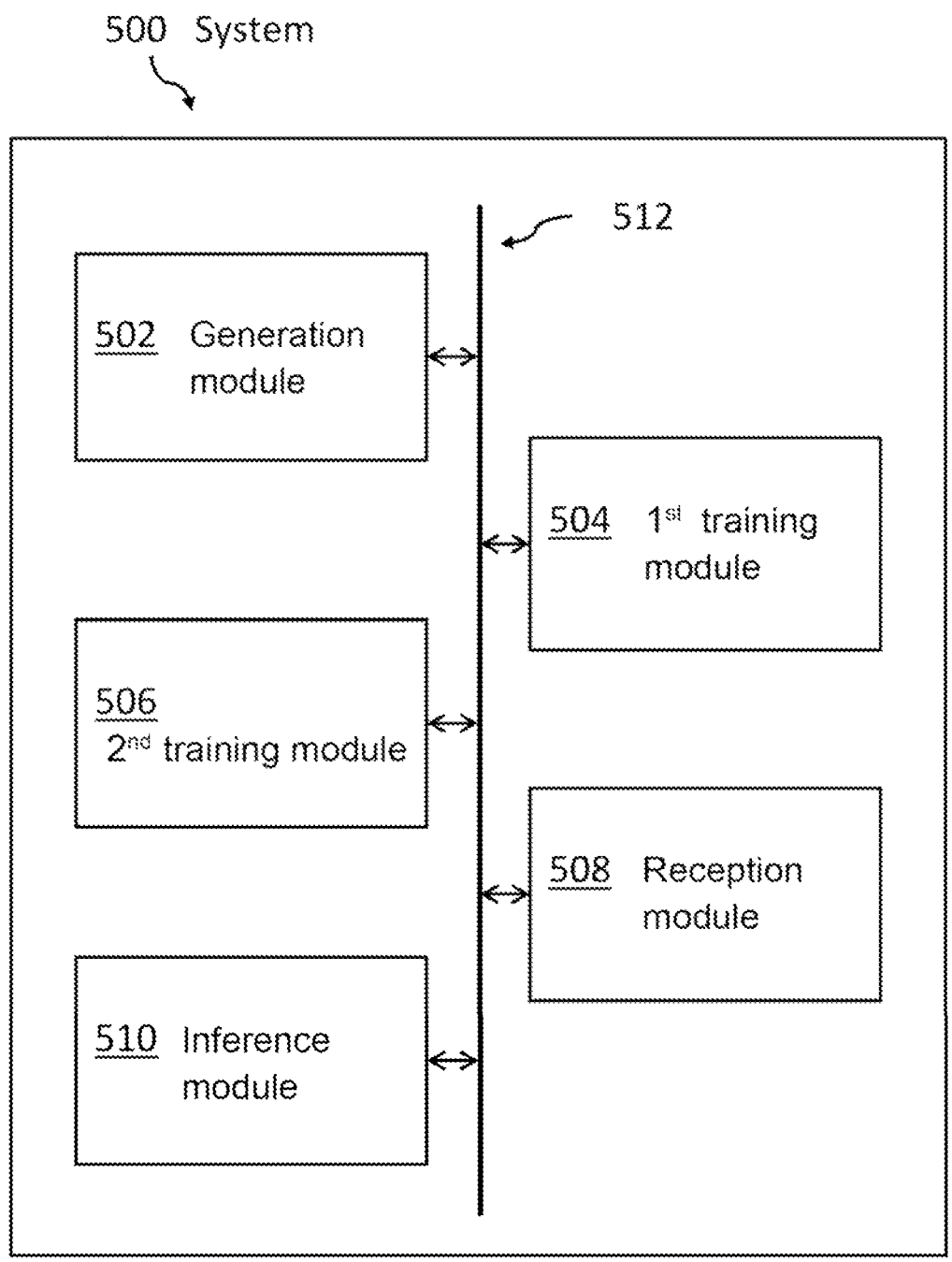
FIG. 5 illustrates a diagram of the inference system according to the disclosure.

FIG. 5 illustrates—for the sake of completeness—a preferred exemplary embodiment of components of the system 500 for determining refractive power, which assist the training of the machine learning system of the proposed method 100 and which are also used in the operative phase of the method. The system for determining refractive power for an intraocular lens to be inserted comprises a generation module 502 which is adapted to generate first training data for a machine learning system on the basis of a first physical model for the refractive power for an intraocular lens.

The system 500 furthermore comprises a first training module 504 which is adapted to train the machine learning system by means of the first training data generated, for the purposes of forming a first learning model for determining refractive power.

A second training module 506 is adapted to train the machine learning system trained with the first training data using clinical ophthalmological training data, for the purposes of forming a second learning model for determining refractive power.

Additionally, the system 500 comprises a reception module 508 which is adapted to provide ophthalmological data of a patient and an expected position of the intraocular lens to be inserted. Finally, the system 500 also comprises an inference unit 510 adapted to infer the refractive power of the intraocular lens to be inserted, by means of the trained machine learning system and the second learning model, with the provided ophthalmological data and the position of the intraocular lens being used as input values for the machine learning system with the second learning model.

Express reference is made to the fact that the modules and units—in particular the generation module 502, the first training module 504, the second training module 506, the reception module 508 and the inference unit 510—can be interconnected by electrical signal lines or by way of a system-internal bus system 512. Additionally, a display unit may also be connected to the bus system 512 in order to display (or otherwise further process) the refractive power.

If a classification system is used as machine learning system, the inferred refractive power arises in accordance with the inferred class which is inferred with the greatest probability. Alternatively, the final refractive power of the IOL can also be implemented by means of a regression system as machine learning system with numerical output variables.

Furthermore, the system 500 may comprise an output unit (not illustrated) which is suitable for outputting or displaying the inferred refractive power.

Figure 6:
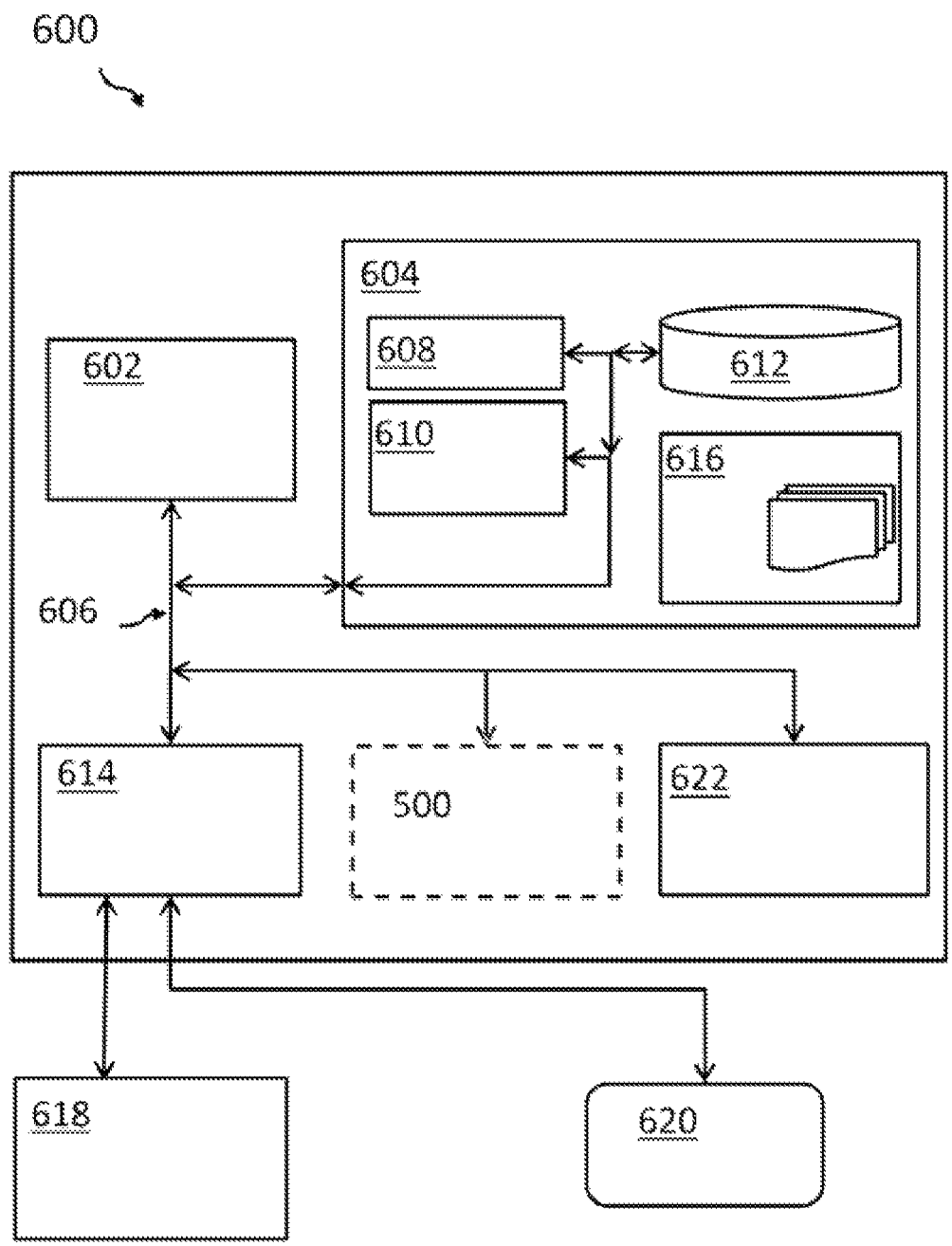
FIG. 6 depicts a diagram of a computer system which may additionally comprise the system according to FIG. 5 in full or in part.

FIG. 6 illustrates a block diagram of a computer system that may have at least parts of the system for determining the refractive power. Embodiments of the concept proposed here may in principle be used together with virtually any type of computer, regardless of the platform used therein to store and/or execute program codes. FIG. 6 illustrates by way of example a computer system 600 that is suitable for executing program code according to the method proposed here and may also contain the inference system in full or in part.

The computer system 600 has a plurality of general-purpose functions. The computer system may in this case be a tablet computer, a laptop/notebook computer, another portable or mobile electronic device, a microprocessor system, a microprocessor-based system, a smartphone, a computer system with specially configured special functions or else a constituent part of a microscope system. The computer system 600 may be configured so as to execute computer system-executable instructions—such as for example program modules—that may be executed in order to implement functions of the concepts proposed here. For this purpose, the program modules may comprise routines, programs, objects, components, logic, data structures etc. in order to implement particular tasks or particular abstract data types.

The components of the computer system may have the following: one or more processors or processing units 602, a storage system 604 and a bus system 606 that connects various system components, including the storage system 604, to the processor 602. The computer system 600 typically has a plurality of volatile or non-volatile storage media accessible by the computer system 600. The storage system 604 may store the data and/or instructions (commands) of the storage media in volatile form—such as for example in a RAM (random access memory) 608—in order to be executed by the processor 602. These data and instructions realize one or more functions and/or steps of the concept presented here. Further components of the storage system 604 may be a permanent memory (ROM) 610 and a long-term memory 612 in which the program modules and data (reference sign 616) and also workflows may be stored.

The computer system has a number of dedicated apparatuses (keyboard 618, mouse/pointing device (not illustrated), screen 620, etc.) for communication purposes. These dedicated devices may also be combined in a touch-sensitive display. An I/O controller 614, provided separately, ensures a frictionless exchange of data with external devices. A network adapter 622 is available for communication via a local or global network (LAN, WAN, for example via the Internet). The network adapter may be accessed by other components of the computer system 600 via the bus system 606. It is understood in this case, although it is not illustrated, that other devices may also be connected to the computer system 600.

At least parts of the system 500 for determining refractive power of an IOL (cf., FIG. 5) may also be connected to the bus system 606.

The description of the various exemplary embodiments of the present disclosure has been given for the purpose of improved understanding, but does not serve to directly restrict the inventive concept to these exemplary embodiments. A person skilled in the art will himself/herself develop further modifications and variations. The terminology used here has been selected so as to best describe the basic principles of the exemplary embodiments and to make them easily accessible to a person skilled in the art.

The principle proposed here may be embodied both as a system, as a method, combinations thereof and/or as a computer program product. The computer program product may in this case comprise one (or more) computer-readable storage medium/media having computer-readable program instructions in order to cause a processor or a control system to implement various aspects of the present disclosure.

As media, electronic, magnetic, optical, electromagnetic or infrared media or semiconductor systems are used as forwarding medium; for example SSDs (solid state devices/drives as solid state memory), RAM (random access memory) and/or ROM (read-only memory), EEPROM (electrically erasable ROM) or any combination thereof. Suitable forwarding media also include propagating electromagnetic waves, electromagnetic waves in waveguides or other transmission media (for example light pulses in optical cables) or electrical signals transmitted in wires.

The computer-readable storage medium may be an embodying apparatus that retains or stores instructions for use by an instruction execution device. The computer-readable program instructions that are described here may also be downloaded onto a corresponding computer system, for example as a (smartphone) app from a service provider via a cable-based connection or a mobile radio network.

The computer-readable program instructions for executing operations of the disclosure described here may be machine-dependent or machine-independent instructions, microcode, firmware, status-defining data or any source code or object code that is written for example in C++, Java or the like or in conventional procedural programming languages such as for example the programming language "C" or similar programming languages. The computer-readable program instructions may be executed in full by a computer system. In some exemplary embodiments, there may also be electronic circuits, such as, for example, programmable logic circuits, field-programmable gate arrays (FPGAs) or programmable logic arrays (PLAs), which execute the computer-readable program instructions by using status information of the computer-readable program instructions in order to configure or to individualize the electronic circuits according to aspects of the present disclosure.

The disclosure proposed here is furthermore illustrated with reference to flowcharts and/or block diagrams of methods, apparatuses (systems) and computer program products according to exemplary embodiments of the disclosure. It should be pointed out that practically any block of the flowcharts and/or block diagrams can be embodied as computer-readable program instructions.

The computer-readable program instructions may be made available to a general-purpose computer, a special computer or a data processing system able to be programmed in another way in order to create a machine such that the instructions that are executed by the processor or the computer or other programmable data processing apparatuses generate means for implementing the functions or procedures that are illustrated in the flowchart and/or block diagrams. These computer-readable program instructions may accordingly also be stored on a computer-readable storage medium.

In this sense, any block in the illustrated flowchart or the block diagrams may represent a module, a segment or portions of instructions that represent several executable instructions for implementing the specific logic function. In some exemplary embodiments, the functions represented in the individual blocks can be implemented in a different order—optionally also in parallel.

The illustrated structures, materials, sequences, and equivalents of all of the means and/or steps with associated functions in the claims below are intended to apply all of the structures, materials or sequences as expressed by the claims.

The invention claimed is:

1. A computer-implemented method for determining a refractive power for an intraocular lens to be inserted, the method including:
   receiving, at a computing system comprising a data processor and non-transitory memory, ophthalmological data of an eye of a patient obtained from an optical coherence tomography (OCT) imaging device, the ophthalmological data comprising at least an axial length, an anterior chamber depth, and a corneal keratometry;
   determining, by the computing system, the refractive power of the intraocular lens to be inserted into the eye of the patient using a machine learning system, the machine learning system trained by:
   generating first training data on the basis of a first physical model for a refractive power for an intraocular lens, wherein the first physical model comprises one or more of a theoretical mathematical model of a human eye or a theoretical ray tracing model of the human eye;
   training the machine learning system using the first training data, for the purposes of forming a first learning model for determining refractive power; and
   further training the machine learning system trained with the first training data using clinical ophthalmological training data, for the purposes of forming a second learning model for determining refractive power,
   wherein the refractive power of the intraocular lens to be inserted into the eye of the patient is determined using the second learning model, with the ophthalmological data of the patient and an expected position in the eye of the patient of the intraocular lens to be inserted being used as inputs for the second learning model; and
   generating a patient-specific surgical plan comprising the determined refractive power and lens position parameters of the intraocular lens, wherein the patient-specific surgical plan is configured for direct use in implanting the intraocular lens during cataract surgery for the patient.

2. The method of claim 1, wherein training the machine learning system comprises:
   generating second training data on the basis of a second physical model for the refractive power for the intraocular lens, with the second physical model being more accurate than the first physical model; and
   training the machine learning system, which was already trained using the first training data, using the second training data, for the purposes of developing the first learning model.

3. The method of claim 1, wherein the machine learning system comprises a neural network.

4. The method of claim 1, wherein the ophthalmological data of the eye comprises at least one of a lens thickness, a posterior chamber depth, a corneal thickness, a lens equatorial plane, a white-to-white distance, or a pupil size.

5. The method of claim 1, wherein the first physical model is representable by a mathematical model.

6. The method of claim 2, wherein the second physical model is representable as a mathematical model or a ray tracing model.

7. The method of claim 1, wherein the clinical ophthalmological training data is determined manually or using a third machine learning system.

8. A system for determining a refractive power for an intraocular lens to be inserted, the system comprising:
   a processor; and
   non-transitory memory in communication with the processor and storing instructions that, when executed by the processor, cause the system to:
   execute a reception module configured to receive ophthalmological data of a patient and an expected position in an eye of the patient of the intraocular lens to be inserted, wherein the ophthalmological data is obtained from an optical coherence tomography (OCT) imaging device, the ophthalmological data comprising at least an axial length, an anterior chamber depth, and a corneal keratometry;
   execute an inference unit configured to determine the refractive power of the intraocular lens to be inserted into the eye of the patient using a machine learning system, with the ophthalmological data and the expected position of the intraocular lens being used as input values for the machine learning system, wherein the machine learning system is trained by:
   a generation module configured to generate first training data for the machine learning system on the basis of a first physical model for a refractive power for an intraocular lens, wherein the first physical model comprises one or more of a theoretical mathematical model of a human eye or a theoretical ray tracing model of the human eye;
   a first training module configured to train the machine learning system using the first training data, for the purposes of forming a first learning model for determining refractive power; and
   a second training module configured to further train the machine learning system trained with the first training data using clinical ophthalmological training data, for the purposes of forming a second learning model for determining refractive power, wherein the refractive power of the intraocular lens to be inserted into the eye of the patient is determined using the second learning model, with the ophthalmological data of the patient and the expected position in the eye of the patient of the intraocular lens to be inserted being used as inputs for the second learning model; and generate a patient-specific surgical plan comprising the determined refractive power and lens position parameters of the intraocular lens, wherein the patient-specific surgical plan is configured for direct use in implanting the intraocular lens during cataract surgery for the patient.

9. A computer program product for determining a refractive power for an intraocular lens to be inserted, wherein the computer program product comprises a non-transitory computer-readable storage medium having program instructions stored thereon, wherein the program instructions, when executed by one or more computers or control units, cause the one or more computers or control units to carry out the method in accordance with claim 1.

\* \* \* \* \*